United States Patent [19]

Hopstock et al.

[11] Patent Number: 5,626,956
[45] Date of Patent: May 6, 1997

[54] HEXAGONAL MAGNETIC FERRITE PIGMENT FOR HIGH DENSITY MAGNETIC RECORDING APPLICATIONS

[75] Inventors: David M. Hopstock, Roseville; John S. Roden; Gunther H. Dierssen, both of White Bear Lake; Ronald S. Sapieszko, Woodbury, all of Minn.

[73] Assignee: Imation Corp., St. Paul, Minn.

[21] Appl. No.: 174,136

[22] Filed: Dec. 28, 1993

Related U.S. Application Data

[62] Division of Ser. No. 762,596, Sep. 19, 1991, Pat. No. 5,378,384.

[51] Int. Cl.$^6$ ................................................. G11B 5/66
[52] U.S. Cl. ..................... 428/323; 428/328; 428/329; 428/330; 428/402; 428/403; 428/694 B; 428/694 BA; 428/694 BH; 428/900
[58] Field of Search ............... 428/694 B, 694 BA, 428/694 BH, 402, 403, 323, 328, 329, 330, 900

[56] References Cited

U.S. PATENT DOCUMENTS

| | | | |
|---|---|---|---|
| 4,341,648 | 7/1982 | Kubo et al. | 252/62.63 |
| 4,425,401 | 1/1984 | Ido et al. | 428/329 |
| 4,529,542 | 7/1985 | Umezawa et al. | 530/350 |
| 4,543,198 | 9/1985 | Kamiyama | 252/62.59 |
| 4,548,801 | 10/1985 | Nagai et al. | 423/594 |
| 4,582,623 | 4/1986 | Kubo et al. | 252/62.59 |
| 4,584,242 | 4/1986 | Nagai | 428/403 |
| 4,585,697 | 4/1986 | Kato et al. | 428/403 |
| 4,606,971 | 8/1986 | Ido et al. | 428/328 |
| 4,664,831 | 5/1987 | Hibst | 252/62.59 |
| 4,677,024 | 6/1987 | Kitahata et al. | 428/328 |
| 4,699,771 | 10/1987 | Yokoyama et al. | 423/138 |
| 4,705,718 | 11/1987 | Kitahata et al. | 428/323 |
| 4,714,654 | 12/1987 | Ito et al. | 428/328 |
| 4,778,734 | 10/1988 | Ohdan et al. | 428/694 BA |
| 4,781,852 | 11/1988 | Kaczur et al. | 252/62.59 |
| 4,786,430 | 11/1988 | Mair | 252/62.58 |
| 4,806,429 | 2/1989 | Nagai et al. | 428/403 |
| 4,810,402 | 3/1989 | Mair | 252/62.58 |
| 4,820,433 | 4/1989 | Yamamoto | 252/62.57 |
| 4,851,292 | 7/1989 | Nagai et al. | 428/403 |
| 4,855,205 | 8/1989 | Saha et al. | 430/106.6 |
| 4,886,714 | 12/1989 | Torti et al. | 428/694 BH |
| 5,028,483 | 7/1991 | Chernega et al. | 428/329 |

FOREIGN PATENT DOCUMENTS

| | | |
|---|---|---|
| 0297392 | 1/1989 | European Pat. Off. . |
| 0346123 | 12/1989 | European Pat. Off. . |
| 0377821 | 7/1990 | European Pat. Off. . |
| 3537624 | 4/1987 | Germany . |
| 3729693 | 5/1988 | Germany . |
| 58-56302 | 4/1983 | Japan . |
| 62-297216 | 12/1987 | Japan . |
| 1-111728 | 4/1989 | Japan . |

OTHER PUBLICATIONS

Research Disclosure, No. 301, issued May 1989, published by Kenneth Mason Publications Ltd., p. 368, abstract No. 30 199.
Chem. Abstracts, vol. 95, No. 6, issued Aug. 10, 1981 (Columbus, OH), Matsugaki Yakuhin Kogyo K.K. "Magnetic Pigment", see p. 747, column 2, abstract No. 53 885k.
Chem. Abstracts, vol. 108, No. 20, issued May 16, 1988 (Columbus, OH), Zheng Yang et al.
"Preparation and Magnetic Properties of Cobalt and Titanium Substituted Barium Ferrite Fine Plateled Particles," see p. 768, column 1, abstract No. 178 677n.
PCT International Search Report (Nov. 25, 1992).

Primary Examiner—Leszek Kiliman
Attorney, Agent, or Firm—Susan Moeller Zerull

[57] ABSTRACT

The present invention provides a hexagonal magnetic ferrite pigment suitable for high density magnetic recording applications. The pigment is characterized by small particle size, a modified magnetoplumbite structure, and relatively high magnetic moment. The pigment is capable of being prepared by firing suitable precursor particles in air at temperatures below 850° C.

11 Claims, No Drawings

HEXAGONAL MAGNETIC FERRITE PIGMENT FOR HIGH DENSITY MAGNETIC RECORDING APPLICATIONS

This is a division of application Ser. No. 07/762,596 filed Sep. 19, 1991, now U.S. Pat. No. 5,378,384.

FIELD OF THE INVENTION

The present invention concerns hexagonal, platelet-shaped magnetic ferrite particles as well as magnetic recording media incorporating magnetic ferrite particles. The present invention also concerns a method which allows magnetic ferrite particles to be prepared by calcining in air at low temperatures.

BACKGROUND OF THE INVENTION

Coated magnetic recording media are extensively used for a wide variety of applications, including audio recording, video recording, data storage, and the like. Coated magnetic recording media typically comprise at least one magnetizable layer coated onto a nonmagnetizable support. The least expensive and most widely used magnetic recording media are particulate media, in which the magnetic layer comprises a magnetic pigment dispersed in a polymeric binder.

Recent years have seen a marked increase in the density of magnetic recording. To function effectively at higher recording densities, magnetic pigments must have small particle size (smaller than the smallest "bit" of magnetic information), high coercivity (resistance to demagnetization), and high magnetization (magnetic moment per unit volume). Because magnetic recording media may be used to store irreplaceable information, magnetic pigments must also have exceptional stability when exposed to repeated mechanical stresses and to changes in environmental conditions, e.g., changes in temperature, humidity, and pollutant levels.

Hexagonal ferrite particles with uniaxial anisotropy have gained attention as a candidate pigment for high-density magnetic recording. These particles are typically platelet-shaped with diameter:thickness ratios in the range from 3:1 to 15:1. Because of their strong uniaxial magnetocrystalline anisotropy, which is perpendicular to the plane of the particle, even very small hexagonal particles, less than 0.05 micron in diameter, show relatively high coercivity values. Moreover, because hexagonal ferrite particles are comprised of metal ions which are, typically, all in the fully oxidized state, the particles are very stable chemically. For perpendicular recording, hexagonal magnetic ferrite particles may be aligned such that the platelets are oriented parallel to the substrate. Alternatively, excellent electromagnetic performance may also be achieved with longitudinally oriented and unoriented particles.

For recording purposes, single domain, hexagonal ferrite particles of the magnetoplumbite or M-type structure have been the most widely used type of hexagonal ferrite. In unsubstituted form, M-type hexagonal ferrite particles have the chemical formula $B(II)Fe_{12}O_{19}$, where B(II) may be Ba, Sr, Pb, or (in part) Ca, and the iron is all in the trivalent or ferric state (Fe(III)). In Smit and Wijn, *Ferrites*, Wiley, New York, 1959, pp. 180–184, the magnetoplumbite structure is described as a -S-R-S-R-S-R- construction, where S corresponds to a block containing only Fe and O ions in a spinel structure, R is a block containing the B(II) ion, and the ratio of S blocks to R blocks is 1:1. Another hexagonal ferrite structure known to have uniaxial magnetic anisotropy is the W-structure, which can be represented as an -S-S-R-S-S-R-S-S-R- construction, for which the ratio of S blocks to R blocks is 2:1.

Unsubstituted, single domain M-type hexagonal ferrite particles have a coercivity of 4000 to 6000 Øe, which is too high for most magnetic recording applications. To lower the coercivity of the M-type ferrites to a value more suitable for magnetic recording applications, e.g., 300 to 3000 Øe, 2, 4, 5, or 6-valent metal ions have been substituted for a portion of the Fe(III) in amounts such that the average valence of the substituted ions is 3 and such that the molar ratio of the Fe(III) and substituted ions to B(II) ions is 12:1. See O. Kubo et al., "A Study of Substitution Elements for Barium Ferrite Particles for Perpendicular Magnetic Recording," *J of the Magnetics Society of Japan*, v. 12, Suppl. S1 (1989), p. 875. This approach shall be referred to herein as the "linked substitution" method.

For example, U.S. Pat. No. 4,341,648 describes compositions such as $B(II)M(II)_xM(IV)_xFe_{12-2x}O_{19}$ and $B(II)M(II)_{2y}M(V)_yFe_{12-3y}O_{19}$, where M(II) is Co, M(IV) is Ti and Ge, and M(V) is V, Nb, Sb, and Ta. Similarly, U.S. Pat. No. 4,543,198 describes the composition $B(II)M(II)_xM(IV)_xFe_{12-2x}O_{19}$, where M(II) is Co, Ni, and Zn, and M(IV) is Ti, Zr, and Hf. U.S. Pat. Nos. 4,529,542, 4,664,831, 4,778,734, and 4,810,402 describe similar compositions.

A drawback of using the linked substitution method for reducing the coercivity of M-type hexagonal ferrites is that the substitution of the nonmagnetic M(IV) or M(V) ions for the magnetic Fe(III) ion decreases the magnetic moment of the resulting particles. This effect becomes more dramatic as the size of the particles is decreased inasmuch as increasing the degree of substitution increases the rate at which the magnetic moment decreases with decreasing particle size. See, for example, O. Kubo et al., J. Appl. Phys., v. 57 (1985), p. 4280; and U. Meisen and A. Eiling, IEEE Trans. Mag., v. 26 (1990), p. 21.

One approach that has been proposed for increasing the magnetization of M-type hexagonal magnetic ferrite particles is to deposit a layer of a magnetic ferrite spinel, such as magnetite, cobalt, zinc, or nickel ferrite, or solid solutions thereof, on the surface of M-type hexagonal ferrite particles. This can be done either directly, as in U.S. Pat. No. 4,584,242, or by an indirect method, as in U.S. Pat. Nos. 4,778,734, 4,806,429, and 4,851,292. In the indirect method, after M-type hexagonal ferrite particles are formed, they are reacted with an aqueous solution containing a divalent element, such as Zn, and then annealed at high temperature to form a spinel-like outer layer which is deficient in Ba. The disadvantage of the indirect method is that it requires a complicated and expensive series of processing steps in which high-coercivity M-type hexagonal ferrite particles must first be produced and then reacted and annealed to form the sandwich-type particles.

Other magnetoplumbite/spinel composites have been described. For example, U.S. Pat. No. 4,855,205 describes a sintered, two-phase composite containing a ferrite spinel phase and a magnetoplumbite phase. These composites have the composition $B(II)_{1-x}R_xFe_{12}O_{19}$, where R is a trivalent rare earth element. The two-phase composite has a lower magnetic moment than that of single phase magnetoplumbite particles and is used as a carrier for electrophotographic processes. The lower magnetic moment is desirable for electrophotography, but is undesirable for magnetic recording.

In another approach, hexagonal magnetic ferrites having a modified magnetoplumbite structure have been proposed. The modified magnetoplumbite structure is a structure having a ratio of S blocks to R blocks of greater than 1, but less than 2. The modified magnetoplumbite structure thus is intermediate in structure between the M-type and W-type structures.

For example, U.S. Pat. No. 4,886,714 describes hexagonal magnetic ferrite particles having a modified magnetoplumbite structure. To prepare such particles according to U.S. Pat. No. 4,886,714, a precursor powder is first formed by a coprecipitation method. The precursor powder is then fired at 650° C. to 850° C. in a non-oxidizing atmosphere, i.e., either in an inert atmosphere containing an inert gas such as nitrogen or argon and no oxygen, or in the presence of a reducing agent such as carbon powder or hydrogen. According to U.S. Pat. No. 4,886,714, only hexagonal ferrite of the stoichiometric composition (i.e., the substituted or unsubstituted M-type structure having an S block to R block ratio equal to 1) will be obtained if firing occurs in air, and any excess Fe ions added with the intention of forming the modified magnetoplumbite structure will instead be converted into the nonmagnetic alpha ferric oxide, or hematite, phase. When this happens, the magnetization of the resulting particles is reduced. U.S. Pat. No. 4,886,714 adds that, if firing is carried out in air, firing must occur at a temperature over 850° C.

SUMMARY OF THE INVENTION

The present invention provides a hexagonal magnetic ferrite pigment characterized by small particle size, a modified magnetoplumbite structure, and relatively high magnetization, wherein the pigment is capable of being prepared by firing suitable precursor particles in air at temperatures below 850° C. Magnetic pigments according to the present invention comprise hexagonal, platelet-shaped magnetic ferrite particles having a modified magnetoplumbite structure and having approximately the formula:

$$B(II)M(II)_u M(III)_v M(IV)_x M(V)_y M(VI)_z Fe(III)_w O_p$$

wherein

B(II) is at least one metal ion selected from the group consisting of Ba, Sr, Pb, and Ca;

M(II) is at least one divalent metal ion other than Ba, Sr, Pb, Fe(II), and Ca;

M(III) is at least one trivalent metal ion other than Fe(III);

M(IV) is at least one tetravalent metal ion;

M(V) is at least one pentavalent metal ion;

M(VI) is at least one hexavalent metal ion;

Fe(III) is trivalent iron ion;

p is $19+4u-4x-8y-12z$;

u satisfies the relationships
$0.5+x+2y+3z \leq u \leq 2+x+2y+3z$ and $u > 0.5v+2x+3.5y+5z$;

v is 0 to 0.1;

x is 0 to about 0.7;

y is 0 to 0.7;

z is 0 to 0.7;

w is greater than 12 and is 90% to 115% of the value given by $12+2u-v-4x-7y-10z$; and $0 \leq x+y+z \leq 0.7$.

In another aspect the present invention concerns a magnetic recording medium comprising a magnetizable layer disposed on a nonmagnetizable substrate. The magnetizable layer comprises a magnetic pigment dispersed in a binder, wherein the magnetic pigment comprises hexagonal, platelet-shaped magnetic ferrite particles having approximately the formula:

$$B(II)M(II)_u M(III)_v M(IV)_x M(V)_y M(VI)_z Fe(III)_w O_p$$

wherein B(II), M(II), M(III), M(IV), M(V), M(VI), Fe(III), p, u, v, w, x, y, and z are as defined above.

In another aspect, the present invention concerns a method of making hexagonal, platelet-shaped magnetic ferrite particles. According to this method, an aqueous, acidic solution of metal ions is combined with an excess of aqueous base to provide a reaction mixture comprising precipitated precursor particles in admixture with a liquid portion. The metal ions comprise B(II) ions, u moles of M(II) ions per mole of B(II) ions, v moles of M(III) ions per mole of B(II) ions, x moles of M(IV) ions per mole of B(II) ions, y moles of M(V) ions per mole of B(II) ions, z moles of M(VI) ions per mole of B(II) ions, and w moles of Fe(III) ions per mole of B(II) ions. B(II), M(II), M(III), M(IV), M(V), M(VI), Fe(III), u, v, w, x, y, and z are as defined above. After combining the aqueous base with the metal ions, the reaction mixture is conditioned at a temperature in the range from 60° C. to the boiling point of the reaction mixture for at least 5 minutes. The pH of the reaction mixture is then lowered to a value within the range from about 4 to 11. The precursor particles are then separated from the liquid portion of the reaction mixture to provide dried precursor particles. The dried precursor particles are then calcined under conditions sufficient to convert the precursor particles into hexagonal, platelet-shaped magnetic ferrite particles. In preferred embodiments of the present invention, calcining occurs in air at a temperature in the range from 600° C. to 850° C., preferably 625° C. to 800° C., and more preferably 650° C. to 750° C.

The magnetic ferrite particles of the present invention are characterized by a modified magnetoplumbite structure having an excess of S blocks relative to R blocks, but for which the ratio of S blocks to R blocks is less than 2:1. Although the x-ray diffraction pattern of the magnetic ferrite particles of the present invention shows peak characteristics of both the magnetoplumbite and spinel phases, the magnetic ferrite particles of the present invention have the hexagonal, platelet-shape characteristic of a single, hexagonal phase.

The magnetic ferrite compositions of the present invention allow calcining to occur at temperatures in the range from 600° C. to 850° C. in air rather than in a reducing atmosphere. When firing occurs in a reducing atmosphere, a certain amount of the Fe(III) may be reduced to Fe(II). Over time, the Fe(II) may revert to Fe(III), producing changes in the magnetic properties. See Sharrock, M. P., IEEE Trans. Mag., v. 25 (1989), p. 4374. Other time-dependent instabilities, such as post-erase signals resulting from a memory effect, may occur as well. See Koester, E., Ch. 3, "Recording Media," in *Magnetic Recording*, vol. 1, Ed. C. D. Mee and E. D. Daniel, McGraw-Hill, New York, 1987. Such time-dependent instabilities are highly undesirable for applications in which the long-term stability of magnetic properties is desired. Calcining in air, on the other hand, provides preferred magnetic ferrite particles whose iron content is substantially all Fe(III). It is believed that preferred magnetic ferrite particles according to the present invention whose iron content is substantially all Fe(III) would be more stable than prior art particles in which a portion of the iron content is Fe(II). Calcining in air is also less expensive and easier to control than calcining in a non-oxidizing or reducing atmosphere.

DESCRIPTION OF THE PREFERRED EMBODIMENTS

The magnetic ferrite particles of the present invention have approximately the formula ("Formula")

$$B(II)M(II)_u M(III)_v M(IV)_x M(V)_y M(VI)_z Fe(III)_w O_p.$$

According to the present invention, B(II) is at least one metal ion selected from Ba, Sr, Pb, and Ca. In one preferred embodiment, B(II) comprises at least 90 molar percent Ba and up to 10 molar percent of Sr, Pb, Ca, or combinations of Sr, Pb, or Ca. For example, B(II) may comprise at least 90 molar percent Ba and up to 10 molar percent Pb. According to another preferred embodiment, B(II) is substantially all Ba.

M(II) is at least one divalent metal ion other than Ba, Sr, Pb, Fe(II), and Ca. Examples of suitable divalent metal ions for M(II) include Co, Zn, Ni, Cu, Mn, Mg, and the like. Preferably, M(II) comprises Co and Zn having a Co:Zn molar ratio in the range from 10:1 to 1:10, and more preferably from 3:1 to 1:3.

M(III) is at least one trivalent metal ion other than Fe(III). Examples of suitable trivalent ions for M(III) include Cr, Al, Ga, As, Bi, In, Sb, and the like.

M(IV) is at least one tetravalent metal ion. Examples of suitable tetravalent ions include Ti, Sn, Zr, Hf, Ge, and the like. Preferably, M(IV) is Ti and/or Sn.

M(V) is at least one pentavalent metal ion. Examples of suitable metal ions for M(V) include V, Nb, Ta, Sb, and the like.

M(VI) is at least one hexavalent metal ion. Examples of suitable metal ions for M(VI) include Mo, W, and the like.

Fe(III) is trivalent iron ion. According to the present invention, w is greater than 12 and is 90% to 115% of the value given by $12+2u-v-4x-7y-10z$. Preferably, w is within ±5% of the value given by $12+2u-v-4x-7y-10z$, and more preferably w is given by $12+2u-v-4x-7y-10z$.

According to the invention, v is 0 to about 0.1; x is 0 to about 0.7; preferably 0 to 0.5; u satisfies the relationships $0.5+x+2y+3z \leq u \leq 2+x+2y+3z$ and $u > 0.5v+2x+3.5y+5z$; y is 0 to about 0.7; z is 0 to about 0.7; and $0 \leq x+y+z \leq 0.7$. Preferably at least one of v, x, y, or z is 0. More preferably each of v, y, and z is 0.

In limiting v to a value in the range from 0 to 0.1 and x, y, and z to values in the range from 0 to about 0.7, preferably 0 to 0.5, the present invention instructs the skilled worker to use a lesser amount of trivalent, tetravalent, pentavalent, and hexavalent ions relative to the teachings of the prior art. We have discovered that such ions, and the tetravalent element in particular, not only reduce the magnetic moment of the hexagonal, magnetic ferrite particles, but they also increase the firing temperature necessary to prepare well-crystallized hexagonal, magnetic ferrite particles. Generally, the use of lower firing temperatures is preferred over higher firing temperatures since, at higher firing temperatures, larger-sized particles are formed. Accordingly, by reducing the amount of the trivalent, tetravalent, pentavalent, and hexavalent ions to a value within the range specified by the present invention, well-crystallized, hexagonal, magnetic ferrite particles having smaller particle size and higher magnetization may be formed at lower temperatures relative to particles having greater amounts of such ions.

The values for u, v, w, x, y, z, and p may be derived as follows. The standard M-type hexagonal magnetic ferrite has the formula $B(II)Fe_{12}O_{19}$, and the formula for the substituted M-type ferrite can be written $$B(II)M(II)_{x+2y+3z}M(IV)_xM(V)_yM(VI)_zFe_{12-2x-3y-4z}O_{19}.$$

The compositions of the present invention are achieved by adding n moles, wherein n is greater than 0.5 and less than 2, of the ferrite spinel composition, $M(II)Fe_2O_4$ to the formula for substituted M-type hexagonal ferrite, given above. When this is done, the formula for the substituted ferrite becomes

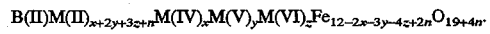

If we give the symbol u to the total number of moles of M(II), then $$u=x+2y+3z+n.$$

The symbol n can then be eliminated from the equation by making the substitution $$n=u-x-2y-3z.$$

As is well known in the prior art, we can also allow for the one-for-one substitution of a small mole fraction v of another trivalent element for Fe(III). When these substitutions are made, the formula becomes $$B(II)M(II)_uM(III)_vM(IV)_xM(V)_yM(VI)_zFe_wO_p,$$

where $$W=12+2u-v-4x-7y-10z$$

and $$p=19+4u-4x-8y-12z.$$

We have further found that, to obtain a high magnetic moment, the quantity n should be greater than or equal to 0.5 but less than 2. Mathematically, this requirement is equivalent to $$0.5+x+2y+3z \leq u \leq 2+x+2y+3z.$$

We have also found that, for high magnetic moments, w should be greater than 12. From the expression above for w, this requirement is equivalent to $$u > 0.5v+2x+3.5y+5z.$$

We have further found that magnetic moments as high as 57 to 63 emu/g may still be obtained when the quantity w is from 90% to 115% of the value given by $12+2u-v-4x-7y-10z$.

The magnetic ferrite particles may comprise small quantities of other elements such as Li, B, F, Si, P, K, Pt, Au, Tl, the Lanthanide elements, and the like. Preferably, however, the magnetic ferrite particles comprise substantially no Si, either in the form of Si ions or in the form of $SiO_2$. "Substantially no Si" means that the magnetic ferrite particles comprise less than 0.10 weight percent Si. When calcined in air at temperatures below about 675° C., magnetic ferrite particles having substantially no Si show a more uniform hexagonal, platelet shape and a more uniform particle size distribution relative to magnetic ferrite particles having a greater Si content.

The magnetic ferrite particles of the present invention are characterized by a combination of relatively small particle size and relatively high magnetic moment. For example, the surface area of the particles as determined by BET gas absorption typically ranges from 20 to 80 m²/g, preferably from 30 to 60 m²/g, and more preferably from 45 to 55 m²/g. The magnetic moment of the particles as measured by a vibrating sample magnetometer on a compressed randomly aligned powder sample at an applied field of 10,000 Øe ranges from 55 to 65 emu/g, and more typically is 57 to 63 emu/g. It is believed that this combination of small size and high magnetic moment has not been achieved with previously known magnetic ferrite particles having the modified magnetoplumbite structure.

Preferably, the diameter of the magnetic ferrite particles of the present invention ranges from 0.02 to 0.15 μm, and more typically is about 0.06 μm. The ratio of the diameter of the particles to the thickness of the particles ranges from 3:1 to 15:1, and more typically is about 5:1. The coercivity of the particles ranges from 300 to 3000 Øe. A particular coercivity within this range may be obtained by varying the composition. For example, either increasing u or increasing x causes the coercivity to decrease.

According to a preferred method of making the magnetic ferrite particles, an aqueous acidic solution of metal ions is combined with a stoichiometric excess of an aqueous base to provide a reaction mixture of precipitated precursor particles in admixture with a liquid portion. The metal cations comprise B(II), M(II), Fe(III), M(III), M(IV), M(V), and M(VI) ions in amounts according to the Formula. Generally, the step of combining the aqueous, acidic solution of metal ions with the stoichiometric excess of the aqueous base may take place at atmospheric pressure at a temperature below the boiling points of the aqueous, acid solution and the aqueous base. Reaction temperatures in the range from 60° C. to the boiling point of the reaction mixture have been found to be suitable in the practice of the present invention.

In preparing the aqueous, acidic solution of B(II), M(II), Fe(III), M(III), M(IV), M(V), and M(VI) ions, the metal ions are originally in the form of water soluble salts such as chlorides, nitrates, oxalates, acetates, and the like. With the exception of Ti, the metal ions preferably are originally in the form of chlorides in that water soluble metal chlorides can generally be obtained at low cost. In the case of Ti, however, $TiCl_4$ is highly volatile, toxic, and difficult to weigh accurately. Preferably, therefore, the present inventors have now discovered that Ti is advantageously obtained from $K_2TiO(C_2O_4)_2 \cdot 2H_2O$, a salt commercially available from Pfaltz & Bauer, Inc. This titanium salt is water soluble, is less hazardous than $TiCl_4$, and is easy to weigh accurately. Sulfates and fluorides of the metal ions should not be used in order to avoid precipitation of B(II) salts such as $BaSO_4$, $CaSO_4$, $PbSO_4$, $SrSO_4$, $BaF_2$, $CaF_2$, $PbF_2$, and $SrF_2$.

Generally, the aqueous acidic solution is prepared by dissolving all of the salts, except the Ti salt if any, in water containing a small amount of free acid. The acid is present in a sufficient amount such that all of the salts dissolve in solution. For example, adding enough acid such that the solution has a pH of about 1 has been found to be suitable in the practice of the present invention. The Ti salt, if any, is first dissolved in deionized water at a temperature in the range from 50° C. to 100° C. and then combined with the acidic solution comprising the other metal ions shortly before combining the metal ions with the base. The concentration of the various metal ions in the acid solution is not critical, although using about 250 to 500 grams of the metal salts per liter of solution has been found to be suitable in the practice of the present invention.

Aqueous bases suitable in the practice of the present invention include NaOH and/or KOH optionally in admixture with other bases such as $Na_2CO_3$. Of these, a concentrated, aqueous solution of 25 to 50 percent by weight NaOH is preferred. The aqueous base is used in an amount such that there is a stoichiometric excess of the base. That is, the base is present at more than the stoichiometric amount required to convert all of the metal ions to hydroxides. Preferably, the base is used in an amount such that there is a 100% to 200% stoichiometric excess of the base. If too little base is used, the resulting magnetic ferrite particles will have lower magnetic moment, broader size distribution, lower BET specific surface area and more irregular shapes relative to particles prepared using greater amounts of base. On the other hand, using more than a 200 percent excess of the base provides little additional benefit as compared to using lesser amounts of base.

After combining the aqueous acidic solution of metal ions with the aqueous base, the reaction mixture is conditioned at a temperature in the range from 60° C. to the boiling point of the reaction mixture for at least 5 minutes. Preferably, conditioning occurs at about 80° C. or higher for 5 to 120 minutes, and more preferably at about 90° C. for 20 to 60 minutes.

After conditioning the reaction mixture, the pH of the reaction mixture is lowered to a value in the range from 4 to 11. The pH of the reaction mixture can be lowered in a variety of ways. According to one technique, the pH is lowered using a series of dilution and decantation stages. According to this technique, the reaction mixture is first diluted with deionized or distilled water. Generally, diluting the reaction mixture with 4 to 50 liters of water per liter of the reaction mixture would be suitable in the practice of the present invention. The precursor particles are then allowed to settle, and excess liquid is decanted. This technique is repeated until substantially all of the soluble salts are removed from the reaction mixture. For purposes of the present invention, substantially all of the soluble salts are considered to be removed from the reaction mixture when the conductivity of the decanted liquid is 100 micromho/cm or less. Generally, from 4 to 10 decantation stages have been found to be suitable in the practice of the present invention.

When the pH of the reaction mixture is strongly basic, the precursor particles settle quite readily. As the pH of the reaction mixture is lowered with each successive dilution and decantation stage, however, the particles do not settle as readily. Accordingly, after the first or second decantation stage, the present inventors have now discovered that a magnesium flocculant may be added to the reaction mixture in order to facilitate the settling of the particles. Examples of suitable magnesium flocculants include magnesium salts such as $MgCl_2$ and $Mg(NO_3)_2$.

The use of organic flocculants should be avoided. During calcining, such flocculants tend to decompose into species that reduce Fe(III) to Fe(II). When this happens, the resulting magnetic ferrite particles tend to have lower magnetization and more irregular shapes relative to particles prepared with magnesium flocculants.

By incorporating an acid neutralizing step into one of the dilution and decantation stages, the number of dilution and decantation stages can be reduced from about 4 to 10 stages to 3 stages or less. According to one variation of this approach, the first two dilution and decantation stages are performed as described above. That is, the reaction mixture is diluted with deionized or distilled water; the particles are allowed to settle; the excess liquid is decanted; and then this process is repeated one more time. Since the reaction mixture is generally strongly basic during these first two decantation stages, the particles settle rapidly without requiring a magnesium flocculant. After the second decantation stage, the reaction mixture is again diluted with deionized or distilled water. Next, however, instead of decanting excess liquid as before, a sufficient amount of aqueous acid is added directly to the reaction mixture in order to adjust the pH to the desired value. After adding a sufficient amount of the acid to adjust the pH to a value in the range from 4 to 11, the particles settle rapidly. No further dilution and decantation stage is required.

According to another technique, the pH of the reaction mixture may be lowered by a combination of filtration and/or neutralization steps. In those cases in which filtration is used, a plate and frame filter press is preferred for filtering.

For example, according to one approach, the reaction mixture is first filtered to collect a filter cake of the precipitated precursor particles. The filter cake is then reslurried with deionized water to about 25% solids. The resulting slurry is neutralized with acid and then filtered again to collect a filter cake of the precipitated precursor particles. As an alternative approach, the pH of the reaction mixture may be lowered by neutralizing the reaction mixture with acid first and then filtering the neutralized mixture to collect a filter cake of the precipitated precursor particles. It has been found that the neutralized mixture filters about 3 times more rapidly than the unneutralized mixture.

Suitable acids for adjusting the pH of the admixture include HCl, $HNO_3$, $H_2SO_4$, and the like. For example, solutions of 1 to 12 molar HCl have been found to be useful for adjusting the pH of the admixture. Combinations of these acids may also be used in the practice of the present invention. For example, a combination of aqueous HCl and aqueous $H_2SO_4$ may be used.

With the pH of the reaction mixture adjusted to the desired value, the particles of the reaction mixture are separated from the remaining liquid portion of the reaction mixture after which the liquid portion may be discarded. The particular technique used to separate the particles from the remaining liquid portion of the reaction mixture is not critical and may be accomplished by a variety of solid/liquid separation techniques. Such techniques include, for example, spray drying, drying in an oven, filtering the reaction mixture, decanting excess liquid, or directly heating the reaction mixture at the temperature for calcining whereby excess liquid is first evaporated and the particles are then calcined in one operation. Combinations of such techniques are also within the scope of the invention.

As one example of an approach for separating the particles from the liquid portion of the reaction mixture, excess liquid is decanted and the particles are then dried in an oven. Generally, drying conditions of 100° C. to 150° C. are suitable in the practice of the present invention. Optionally, after decanting excess liquid, the remainder of the reaction mixture may be filtered to collect the particles before the particles are dried in an oven.

After separating the particles from the liquid portion of the reaction mixture, the precursor particles are then calcined under conditions sufficient to convert the precursor particles into magnetic ferrite particles. Generally, calcining conditions of 600° C. to 850° C. for 30 minutes to 4 hours would be suitable in the practice of the present invention. Preferably, calcining occurs in air at a temperature in the range from 600° C. to 850° C., more preferably 625° C. to 800° C., and most preferably 650° C. to 750° C. The magnetic moment and BET specific surface area of the resulting magnetic ferrite particles depend upon the calcining temperature. Increasing the calcining temperature increases the magnetic moment and decreases the BET specific surface area of the particles.

Preferably, a water soluble flux is added to the precursor particles before calcining. The flux is added in order to help prevent sintering and to promote crystallization of the particles. Examples of suitable fluxes include NaCl, $Na_2SO_4$, KCl, $BaCl_2$, NaBr, $B_2O_3$, and combinations of such materials. Preferably the flux is NaCl. Another preferred flux is a mixture of NaCl and $Na_2SO_4$ having a weight ratio of $Na_2SO_4$: NaCl in the range from 0.1 to 1, and preferably 0.1 to 0.50.

It is believed that when the pH of the reaction mixture has been lowered by adding aqueous acid such as HCl and/or aqueous $H_2SO_4$ to the reaction mixture, and all or part of the liquid portion of the reaction mixture is dried in an oven along with the particles, NaCl and/or $Na_2SO_4$ are formed in situ. Accordingly, when these salts are formed in situ, it may not be necessary to add additional salts as a flux prior to calcining the precursor particles. In such instances, additional salts optionally may be added either before, or after, all of the liquid portion has been removed.

The flux is used in an amount sufficient to reduce sintering and agglomeration of the particles during calcining. Preferably, 5 to 1000 parts by weight of flux are used per 100 parts by weight of the precursor particles. For example, a flux of NaCl may comprise 5 to 1000, preferably 5 to 50, and more preferably 10 to 20 parts by weight of NaCl per 100 parts by weight of the precursor particles. In those instances in which a flux is used, calcining preferably occurs at a temperature below the melting point of the flux.

After calcining the mixture of the flux and the precursor particles, the flux is separated from the resulting magnetic ferrite particles by a suitable technique such as washing the mixture of the flux and the calcined particles with water or an aqueous acid to remove the flux. Preferably, such washing is accomplished with deionized or distilled water and occurs at a temperature in the range from room temperature to 100° C., and more preferably at about 90° C.

The magnetic ferrite particles of the present invention are particularly suitable for use in magnetic recording media. Magnetic recording media according to the present invention comprise a magnetizable layer disposed on a nonmagnetizable substrate. The nonmagnetizable substrate may be any suitable substrate material known in the art. Examples of suitable substrate materials include, for example, polyesters such as polyethylene terephthalate ("PET"); polyolefins such as polypropylene; cellulose derivatives such as cellulose triacetate or cellulose diacetate; polymers such as polycarbonate, polyvinyl chloride, polyimide, polyphenylene sulfide, polyacrylate, polyether sulphone, polyether ether ketone, polyetherimide, polysulphone, aramid film, polyethylene 2,6-naphthalate film, fluorinated polymer, liquid crystal polyesters, polyamide, or polyhydric acid; metals such as aluminum, or copper; paper; or any other suitable material.

The magnetizable layer comprises the magnetic ferrite particles of the present invention dispersed in a binder. The type of binder is not critical and may be any suitable binder material known in the art. The magnetizable layer of the present invention preferably comprises from about 50 to 95, preferably about 65 to 90, and more preferably about 70 to 85 percent by weight of magnetic ferrite particles dispersed in the binder. The percent by weight of magnetic ferrite particles is based on the total weight of the magnetizable layer.

In addition to the binder and the magnetic ferrite particles, the magnetizable layer of the present invention may also comprise one or more conventional additives such as lubricants; abrasives; thermal stabilizers; antioxidants; dispersants; wetting agents; antistatic agents; fungicides; bacteriocides; surfactants; coating aids; nonmagnetic pigments; and the like in accordance with practices known in the art.

In preparing the magnetic recording media of the present invention, the components of the magnetizable layer are combined with a suitable solvent to prepare a dispersion which is then coated onto the nonmagnetizable substrate. Examples of suitable solvents may include ketones such as acetone, methyl ethyl ketone ("MEK"), methyl isobutyl ketone, or cyclohexanone; alcohols such as methanol, ethanol, propanol, or butanol; esters such as methyl acetate, ethyl acetate, butyl acetate, ethyl lactate, or glycol diacetate;

monoethyl ether or the like; water-based systems; tetrahydrofuran; glycol ethers such as ethylene glycol dimethyl ether, or ethylene glycol monoethyl ether; dioxane or the like; aromatic hydrocarbons such as benzene, toluene, or xylene; aliphatic hydrocarbons such as hexane or heptane; nitropropane or the like; and mixtures thereof.

The dispersion may be applied to the substrate using any conventional coating technique, such as gravure coating techniques or knife coating techniques. The coated substrate may then be passed through a magnetic field to orient the magnetic ferrite particles, after which the binder is dried and cured, if necessary.

The invention will now be further described with reference to the following examples.

EXAMPLE 1

240.0 g NaOH pellets and 400 ml deionized water were charged to a 2 liter stainless steel vessel equipped with a high shear mixer. Three other separate solutions were also prepared: 132.4 g (0.49 moles) of $FeCl_3.6H_2O$ were dissolved in 300 ml of deionized $H_2O$ and 25 ml of 38% HCl; 9.6 g (0.039 moles) of $BaCl_2.2H_2O$, 11.6 g (0.049 moles) of $CoCl_2.6H_2O$ and 5.4 g (0.245 moles) of $Zn(C_2H_3O_2)_2.2H_2O$ were dissolved in 100 ml of deionized $H_2O$; and 8.6 g (0.0245 moles) of $K_2TiO(C_2O_4)_2.2H_2O$ were dissolved in 100 ml of deionized $H_2O$ with heating at 60° C. These three solutions were combined and added with vigorous stirring to the 2 liter vessel which contained the NaOH solution. The heat of mixing and neutralization raised the temperature of the reaction mixture to 52° C. The reaction mixture was heated to boiling and held at 100° C. to 114° C. for 2 hours. At this point a solution of 4.3 g (0.0168 moles) of $Mg(NO_3)$ .$6H_2O$ dissolved in 30 ml of deionized $H_2O$ was added and mixing continued for 2 more minutes.

The reaction mixture was transferred to a 17 liter glass vessel and settle washed 6 times by dilution and decantation after which the wash water had a conductivity of 30 micromho/cm. The reaction mixture was then filtered to collect the precipitate, and the collected precipitate was dried at 110° C. for 23 hours.

The dried precipitate was ground through a 0.25 millimeter screen by mechanical means.

30.0 g of the dried precipitate were placed in a ceramic crucible and then placed in a muffle furnace at 850° C. in an air atmosphere for 45 min. The sample was pulled from the furnace and cooled to room temperature in 30 minutes. The saturation magnetization of the resulting magnetic ferrite particles as measured using a vibrating sample magnetometer at 12.7 kØe was determined to be 61.5 emu/g. Since a flux was not used to prepare these particles, the particles were not washed after being removed from the furnace.

A dispersion of the magnetic ferrite particles was prepared as follows. 16 grams of the magnetic ferrite particles were transferred to a 160 $cm^3$ Quickee mill containing 200 grams of ⅛ -inch steel ball grinding media. Next, 1.1 grams of a polyethyleneoxide phosphate ester surfactant having molecular weight of about 700 was added to the mill along with 7.3 grams of toluene solvent. The contents of the mill were then milled for 25 minutes.

Meanwhile, a solution of the following ingredients was prepared:

| Ingredient | Amount |
| --- | --- |
| Vinyl chloride copolymer (VYHH) | 3.0 g |
| Di-octylphthalate | 1.0 g |
| Methyl ethyl ketone | 13.8 g |

The solution was added to the mill after which the mill contents were milled for an additional 3 minutes.

The dispersion was then immediately coated by knife coating techniques onto a 1-mil polyethylene terephthalate film. Longitudinal orientation of the wet coating was accomplished using a 1600 gauss DC magnet. The magnetic properties of the tape measured in the direction of orientation using a 3kØe 60Hz M-H meter were as follows: a squareness of 0.674, a coercivity of 730 Øe, a remanence of 840 gauss, and a switching field distribution of 0.304.

Physical and chemical analysis of the magnetic ferrite particles was also performed. The surface area was determined to be 32 $m^2/g$ by BET nitrogen adsorption techniques with a composition as follows:

| Metal Ion | Weight Percent | Moles Relative to Ba |
| --- | --- | --- |
| Ba | 10.07 | 1.00 |
| Fe | 53.84 | 13.15 |
| Co | 5.55 | 1.28 |
| Zn | 2.70 | 0.56 |
| Ti | 2.06 | 0.59 |
| Mg | 0.70 | 0.39 |

EXAMPLE 2

The following solutions were prepared. If not otherwise identified, all materials were analytical grade.

Solution A: 19.54 g (0.080 mole) $BaCl_2.2H_2O$; 15.23 g (0.064 mole) $CoCl_2.6H_2O$; 10.54 g (0.048 mole) $Zn(CH_3COO)_2.2H_2O$; 302.73 g (1.120 mole) $FeCl_3.6H_2O$; 25 $cm^3$ 37% hydrochloric acid; 900 $cm^3$ deionized water.

Solution B: 5.67 g (0.016 mole) $K_2TiO(C_2O_4)_2.2H_2O$; 100 $cm^3$ deionized water.

Solution C: 479.96 g (12.00 mole) NaOH; 1000 $cm^3$ deionized water.

Solution D: 9.92 g (0.0375 mole) $Mg(NO_3)_2.6H_2O$; 100 $cm^3$ deionized water.

Solutions A and B were prepared in glass beakers at 60° C. and 66° C. respectively. Solution C was held at 60° C. in a 3-liter stainless steel beaker with agitator and cover on a hotplate. Solution B was poured into solution A and stirred. The combined solution of A and B was then quickly poured into the stainless steel beaker, and the agitator revolution rate was increased to give vigorous mixing without splashing from the beaker. A brown precipitate immediately appeared, and the temperature of the reaction mixture increased to 85° C. The hotplate was used with a temperature controller to increase the temperature of the reaction mixture to 90° C. in 6 minutes. After a temporary overshoot to 94° C., the temperature was held at 90° C. with vigorous agitation continued for a period of 60 minutes from the time of mixing.

The beaker contents were then poured into a 20-gallon plastic wash tank and diluted with approximately 70 liters of room temperature deionized water. After settling, the liquid portion was decanted. Chemical analysis indicated that the liquid portion had a Ba content of 0.1 ppm. Another 70 liters of water and approximately half of Solution D were added and the reaction mixture was stirred. Decantation and redilution were repeated, with the remainder of Solution D added. The process was repeated again, with another 70 liters of deionized water added. At this point the solids flocculated and settled without addition of a flocculant. The conductivity of the liquid portion was 140 micromho/cm, and the pH was 9. After a final decantation, the concentrated slurry was dried at 120° C.

The lumps of dried precursor cake were divided into two samples of 62.8 g each. The first sample, Sample 1, was mixed with 6.00 g of NaCl produced by pulverizing with "Sterling Salt Crystals" sold for water softening by Akzo Salt, Inc. The second sample, Sample 2, was mixed with 6.00 g of anhydrous reagent grade $Na_2SO_4$ powder. For each sample the lumps were broken up and the salt powder was thoroughly mixed by passing the sample through a Brinkmann ZM1 pulverizer. Samples 1 and 2 were then divided in half to provide Samples 1A, 1B, 2A, and 2B. Samples 1A and 2A were calcined in ceramic crucibles for 2 hours in air at 650° C., while Samples 1B and 2B were calcined in air at 700° C.

After calcining, each of samples 1A, 1B, 2A, and 2B, was separated from the flux as follows. Each sample was combined with 500 $cm^3$ of deionized water in a 1 liter glass beaker. The water had been pre-heated to 90° C. prior to adding the sample to the water. After adding the sample to the water, the contents of the beaker were agitated for 15 minutes. After agitating, the contents of the beaker were diluted to approximately 1 liter with room temperature deionized water. Excess liquid was then decanted. Dilution and decantation were continued until the conductivity of the supernatant was less than 20 micromho/cm. After the final decantation, the resulting magnetic ferrite particles were dried at approximately 120° C. for 16 hours. Lumps of the particles were broken up by passing the particles through a 60-mesh screen.

The particles formed from all four samples were well-crystallized hexagonal platelets with diameters of approximately 0.05 to 0.10 μm and diameter to thickness ratios of 4:1 to 8:1. The chemical analyses of the four samples were nearly identical, averaging $BaCo_{0.83}Zn_{0.61}Mg_{0.45}Mn_{0.04}Ti_{0.19}Fe_{14.78}O_{25.49}$. The magnetic properties of the samples were measured on a randomly aligned powder sample with a vibrating sample magnetometer. The magnetic moment, σ, was determined at an applied magnetic field of 10,000 Øe. The specific surface area (SSA) was determined by BET gas adsorption. The results were as follows:

| Sample | Flux | Temp. (°C.) | σ (emu/g) | $H_c$(Øe) | SSA ($m^2$/g) |
|---|---|---|---|---|---|
| 1A | NaCl | 650 | 57.2 | 1120 | 53 |
| 1B | NaCl | 700 | 61.5 | 1120 | 45 |
| 2A | $Na_2SO_4$ | 650 | 51.4 | 640 | 54 |
| 2B | $Na_2SO_4$ | 700 | 60.2 | 1080 | 43 |

EXAMPLE 3

A series of magnetic ferrite particles were prepared having the nominal composition $Ba(Co_{1-x}Zn_x)_{1.2}Fe_{14.4}O_{23.8}$, with x=0, 0.25, 0.50, 0.75, and 1.0. Because a Mg salt was used as a flocculant, the samples also contained Mg. The method of preparation for x=0.25 is given in detail below as an example.

The following solutions were prepared from analytical grade materials.

Solution A: 19.54 g (0.080 mole) $BaCl_2.2H_2O$; 17.13 g (0.072 mole) $CoCl_2.6H_2O$; 3.27 g (0.024 mole) $ZnCl_2$; 311.38 g (1.152 mole) $FeCl_3.6H_2O$; 20 $cm^3$ 37% hydrochloric acid; 1000 $cm^3$ deionized water.

Solution C: 479.97 g (12.00 mole) NaOH; 1000 $cm^3$ deionized water.

Solution D: 7.69 g (0.030 mole) $Mg(NO_3)_2.6H_2O$; 100 $cm^3$ deionized water.

Solution A was prepared in a glass beaker and allowed to cool to room temperature. Solution C was prepared in a 3-liter stainless steel beaker with baffles, agitator, and cover; it was held on a hotplate at 50°–60° C. Solution A was quickly poured into the stainless steel beaker, and the agitation rate was increased to give vigorous mixing. The temperature of the reaction mixture increased to 85°–90° C. The hotplate was used with a temperature controller to increase the temperature of the reaction mixture to 90° C. in 5–10 minutes. The temperature was held at 90°–92° C. with vigorous agitation for a period of 60 minutes from the time of mixing.

The beaker contents were poured into an 18-liter glass vessel and diluted with approximately 15 liters of room temperature deionized water. The solids were allowed to settle, and the supernatant decanted. Dilution, settling, and decantation were repeated four more times.

The flocculant solution was added in 50 ml aliquots after the second and third dilutions, when settling was the slowest. The fifth decant solution had a conductivity of approximately 90 micromho/cm and a pH of approximately 10.2. To the concentrated suspension remaining after the fifth decant, 12.00 g of NaCl powder was stirred in and dissolved. The suspension was then dried in glass pans at 150° C. The dried solids were scraped from the pans and pulverized in a Brinkmann ZM1 pulverizer.

The approximately 125 g of powder produced by pulverizing was distributed in approximately 25 g subsamples to 5 ceramic crucibles, which were heated for two hours in an air atmosphere at temperatures of 600, 650, 700, 750, and 800° C. Each subsample was placed into a 1 liter glass beaker containing 500 $cm^3$ of deionized water that had been pre-heated on a hotplate to 90° C. The slurry was agitated for 15 minutes with a Silverson L4R homogenizer while the temperature was held at 80°–90° C. The contents of the beaker were then diluted to approximately 1 liter with room temperature deionized water. After the solids had settled, the excess liquid was decanted. This process was continued until the conductivity of the decanted liquid stabilized at about 10 micromho/cm.

To prepare compositions with x other than 0.25, the same procedure was used, except that the starting amounts of $CoCl_2.6H_2O$ and $ZnCl_2$ were adjusted to give the desired stoichiometry. For the samples calcined at 700° C., the table below gives the chemical analyses, expressed as a ratio of moles of each element to moles of Ba, the magnetic moment at 10 kØe applied field, the coercivity $H_c$, and the BET surface area of the powder.

| Sample # | 1 | 2 | 3 | 4 | 5 |
|---|---|---|---|---|---|
| Nominal x | 0.00 | 0.25 | 0.50 | 0.75 | 1.00 |
| Co/Ba | 1.28 | 0.94 | 0.61 | 0.32 | 0.00 |
| Zn/Ba | 0.00 | 0.30 | 0.56 | 0.83 | 1.05 |
| Zn/(Co + Zn) | 0.00 | 0.24 | 0.48 | 0.72 | 1.00 |
| Mg/Ba | 0.38 | 0.39 | 0.40 | 0.38 | 0.37 |
| Fe/Ba | 15.51 | 15.43 | 15.03 | 15.40 | 15.17 |
| Mag. moment (emu/g) | 58.2 | 61.2 | 62.1 | 60.1 | 54.2 |

-continued

| Sample # | 1 | 2 | 3 | 4 | 5 |
| --- | --- | --- | --- | --- | --- |
| Hc (Øe) | 1240 | 1230 | 1540 | 2040 | 2500 |
| Surf. area (m$^2$/g) | 41 | 39 | 43 | 38 | 35 |

As seen from the data, the highest magnetic moments, i.e., those greater than 60 emu/g, are obtained when x is 0.25, 0.50, and 0.75. Within that range of compositions, the coercivity increases from 1230 Øe at x=0.25 to 2040 Øe at x=0.75.

Although composition had little effect on surface area, the best crystal morphology (hexagonal, platelet-shaped particles having a narrow size distribution) occurred for x=0.50 and 0.75. For x=0.50, particle diameters typically ranged from 0.04 to 0.08 micron, while for x=0.75, they typically ranged from 0.05 to 0.10 micron. For x=0.00 and 0.25, the range was wider, typically from 0.04 to 0.12 micron. For x=1.00, the platelets tended to grow larger, ranging from 0.06 to 0.20 micron.

In comparison with the prior art, it is noteworthy that coercivities as low as 1230 Øe were obtained without the addition of Ti, Sn, Nb, Mo, or any other element with valence of 3 or higher. Since the high-valence elements are nonmagnetic and tend to decrease the magnetic moment, eliminating them promotes a high magnetic moment.

EXAMPLE 4

Nineteen liters of deionized water were added to a 120 liter polyethylene tank. All the deionized water used in this example had a conductivity of less than 3 micromho/cm. To the tank was added 47.43 kg of aqueous photoengraving-grade ferric chloride solution, as supplied by K. A. Steel Chemicals, Inc. This solution contained approximately 38.8% by weight of $FeCl_3$, no more than 0.2% $FeCl_2$, and no more than 3.0% residual acidity (as HCl). The following chemicals were added to the tank as powders: 1954 g of $BaCl_2.2H_2O$, 1332 g of $CoCl_2.6H_2O$, and 1054 g of $Zn(C_2H_3O_2)_2.2H_2O$. Also added was 17 liters of hydrochloric acid solution produced by pouring 2.0 liters of concentrated (approximately 37%) HCl solution into 15 liters of deionized water. The solution was agitated with a polyethylene-covered impeller until all the solids were dissolved, and was allowed to cool to room temperature (approximately 22° C.).

To a 20-liter stainless steel pail, 283 g of $K_2TiO(C_2O_4)_2.2H_2O$ powder and 9.5 liters of deionized water were charged. The solution was mixed to dissolve all of the powder, and the temperature was held at 60°-70° C.

To a 200 liter jacketed stainless steel reactor was added 96.0 kg (about 63 liters) of room temperature industrial-grade 50% sodium hydroxide aqueous solution. The agitator was adjusted to 300 rpm. The titanium potassium oxalate solution was combined and mixed with the metal chloride solution in the 120 liter polyethylene tank, and then the mixture was pumped into the 200 liter reactor over a period of 3.5 minutes. The temperature immediately after mixing was 89° C. Steam was passed through the jacket to heat the slurry to 90°-92° C. and hold it at that temperature for 60 minutes while continuing to agitate at 300 rpm. The reactor was then cooled to about 65° C. by passing cold water through the jacket, and the resultant precursor slurry was pumped to a portable holding tank with enough deionized rinse water to thoroughly rinse the reactor.

The above-described procedure was repeated to produce a second batch of virtually identical precursor slurry. Both batches of precursor slurry were pumped into a 7500 liter wash tank. Deionized water was added until the tank held approximately 5000 liters. An agitator was used to ensure that the precursor slurry was uniformly mixed with dilution water. Agitation was then stopped, and the suspended solids were allowed to settle. After the supernatant had clarified, the supernatant was decanted, leaving about 1000 liters of concentrated slurry in the tank. The supernatant had a pH of 13.0 and a conductivity of 47.5 millimho/cm.

A flocculant solution was prepared by dissolving 1538 g of $Mg(NO_3)_2.6H_2O$ crystals in about 15 liters of deionized water. The concentrated precursor slurry was rediluted and mixed with approximately 4000 liters of deionized water. The flocculant solution was then added, the agitator was turned off, and the solids were allowed to settle. Approximately 4000 liters of clarified supernatant, with a pH of 12.4 and a conductivity of 10.0 millimho/cm, was decanted. The concentrated slurry was rediluted with approximately 4000 liters of deionized water to give a pH of 11.8 and a conductivity of 1.8 millimho/cm. Aliquots of approximately 1 molar hydrochloric acid were added with agitation until the pH of the suspension was reduced to 9.5 and the conductivity to 1.3 millimho/cm. Approximately 28 moles of HCl were required. The suspension was allowed to settle and approximately 4000 liters of supernatant were decanted.

The remaining approximate 1000 liters of concentrated suspension was filtered in a plate-and-frame filter press to give a filter cake containing approximately 30% solids. The filter cake was dried in trays at 100° C. for approximately 40 hours to give 21.0 kg of dried product. This was pulverized and blended with 2.40 kg of powdered NaCl and 0.72 kg of powdered $Na_2SO_4$. Of the 24.1 kg of pulverized and blended precursor, 19.77 kg was selected for calcining. It was calcined in 14 batches of approximately 1.41 kg each in alumina saggers with internal dimensions of approximately 20 cm×20 cm×3.5 cm high. A laboratory oven was preheated to about 770° C. Two saggers were placed in the oven, and the temperature setpoint was adjusted to 725° C. The temperature dropped and then rose to the setpoint in about 15 minutes. The saggers were held at 725° C. for 2 hours and then removed from the oven and allowed to cool to room temperature. Calcining occurred in air. After calcining the combined weight of the 14 batches was 18.46 kg.

The 18.46 kg of calcined powder was placed in a 200 liter epoxy-lined steel drum together with approximately 57 liters of deionized water heated to about 70° C. The slurry was agitated for 20 minutes with a Cowles mixer while the temperature was maintained at 60°-70° C. by an external drum heater. The Cowles mixer was then removed, and room temperature deionized water was stirred in until the liquid level approached the top of the drum. The solids were allowed to settle, and the supernatant was decanted with a siphon. Dilution, settling, and decantation were continued until the conductivity of the supernatant was reduced to 20 micromho/cm (pH=9.5). The concentrated slurry was filtered in a plate-and-frame filter press to give a filter cake containing about 40% solids. The filter cake was dried in trays at 100° C. for approximately 48 hours and pulverized. The weight of recovered product was 14.5 kg.

Chemical analysis of the product was as follows:

| Metal Ion | Weight Percent | Moles Relative to Ba |
|---|---|---|
| Fe | 54.4 | 14.05 |
| Ba | 9.52 | 1.00 |
| Co | 3.14 | 0.77 |
| Zn | 2.29 | 0.51 |
| Mg | 0.67 | 0.40 |
| Ti | 0.31 | 0.09 |
| Mn | 0.19 | 0.05 |
| Si | 0.06 | — |

Measurement by VSM on a powder sample indicated a magnetic moment of 59.6 emu/g at an applied field of 10,000 Øe and a coercivity of 950 Øe. Surface area measurement by BET gas adsorption gave a surface area of 44 m²/g. Transmission electron microscopy showed that the particles were well-dispersed, flat platelets of roughly uniform size, often having roughly hexagonal outlines, with diameters typically in the range of 0.04–0.10 micron, and diameter/thickness ratios ranging from 5/1 to 10/1.

EXAMPLE 5

A 50% solids dispersion was prepared from components as follows:

| Component | Parts by weight |
|---|---|
| Barium Ferrite Pigment from Example 4 | 81.0 |
| Alumina head-cleaning agent (Nadco Japan Ltd. HIT-50) | 3.0 |
| Vinyl chloride/vinyl acetate/ vinyl alcohol copolymer binder resin (Union Carbide VAGH) | 4.9 |
| Thermoplastic polyester urethane binder resin (B. F. Goodrich Estane 5703) | 2.1 |
| Phosphoric acid ester dispersant (GAF RE-610) | 3.5 |
| Myristic acid lubricant | 2.5 |
| Butyl stearate lubricant | 1.0 |
| Polyisocyanate cross-linking agent (Mobay Mondur CB-610) | 2.0 |
| solvent* | 100.0 |

*Solvent was 70 weight percent methyl ethyl ketone, 20 weight percent cyclohexanone, and 10 weight percent toluene.

First, the pigment, the alumina, solvent, and dispersant were combined and milled for 1 hour at 1000 rpm. The two binder resins were then added, and milling was continued for 8 hours at 1700 rpm. Half of the myristic acid was then added, and milling was continued for an additional hour. The dispersion was then diluted with more of the solvent to 40% solids in the mill with mixing. Milling was done in an Igarashi-type laboratory batch sand mill with 1.3 mm ceramic media. The weight ratio of the ceramic media to the solids was 2:1. Just before coating, the remainder of the myristic acid, the butyl stearate, and the isocyanate were added and dissolved with a high-speed disk disperser. The dispersion was then knife-coated onto a 14.2-micron polyethylene terephthalate web travelling at 5 m/min, and oriented in a 3400 Øe longitudinal magnetic field. No calendering was done.

The thickness of the magnetic coating was 2.8 microns, and the gloss measured at 45 degrees was 45 units. The magnetic properties of the coating in the longitudinal direction were determined by a magnetic induction meter operating at 60 Hz with a maximum field strength of 3000 Øe. The coercivity was 1390 Øe, the squareness was 0.85, the remanent induction was 960 gauss, and the switching field distribution (SFD) was 0.29. These measurements indicate a high degree of dispersibility and orientability of the particles in magnetic tape formulations.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A magnetic recording medium comprising:

(a) a nonmagnetizable substrate; and (b) a magnetizable layer disposed on the substrate, said magnetizable layer comprising a magnetic pigment dispersed in a binder, wherein the magnetic pigment comprises hexagonal, platelet-shaped magnetic ferrite particles having a modified magnetoplumbite structure and having approximately the formula:

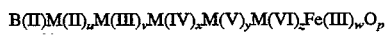

wherein

B(II) is at least one metal ion selected from the group consisting of Ba, Sr, Pb, and Ca;

M(II) is at least one divalent metal ion other than Ba, Sr, Pb, Fe(II), and Ca;

M(III) is at least one trivalent metal ion other than Fe(III);

M(IV) is at least one tetravalent metal ion;

M(V) is at least one pentavalent metal ion;

M(VI) is at least one hexavalent metal ion;

Fe(III) is trivalent iron ion;

p is 19+4u−4x−8y−12z;

u satisfies the relationships 0.5+x+2y+3z≦u≦2+x+2y+3z and u>0.5v+2x+3.5y+5z;

v is 0 to 0.1;

x is 0 to 0.7;

y is 0 to 0.7;

z is 0 to 0.7;

w is greater than 12 and is 90% to 115% of the value given by 12+2u−v−4x−7y−10z; and 0≦x+y+z≦0.7.

2. The magnetic recording medium of claim 1, wherein the magnetic ferrite particles have a BET specific surface area of at least 30 m²/g and a magnetic moment of at least 57 emu/g.

3. The magnetic recording medium of claim 1, wherein v, y, and z are 0.

4. The magnetic recording medium of claim 1, wherein x is 0.

5. The magnetic recording medium of claim 1, wherein M(II) comprises Co and Zn having a Co:Zn molar ratio of from 10:1 to 1:10.

6. The magnetic recording medium of claim 1, wherein B(II) is at least 90 molar percent Ba.

7. The magnetic recording medium of claim 1, wherein B(II) is substantially all Ba.

8. The magnetic recording medium of claim 1, wherein M(IV) is Ti obtained from K₂TiO(C₂O₄)₂·2H₂O.

9. The magnetic recording medium of claim 1, wherein the magnetic ferrite particles contain substantially no Si.

10. The magnetic recording medium of claim 5, wherein the Co:Zn molar ratio is from 3:1 to 1:3.

11. The magnetic recording medium of claim 10, wherein v, x, y, and z are 0.

* * * * *